United States Patent
Sirota et al.

(10) Patent No.: US 11,100,563 B2
(45) Date of Patent: Aug. 24, 2021

(54) SYSTEMS AND METHODS FOR FACILITATING GIFT SELECTION, ATTRIBUTION, AND DISTRIBUTION

(71) Applicant: Loop Commerce, Inc., Stamford, CT (US)

(72) Inventors: Alex Sirota, Los Altos, CA (US); Subha Shetty, Menlo Park, CA (US); Soren Mills, Menlo Park, CA (US); Shane Parrish, Menlo Park, CA (US); Gabriel Saunkeah, Menlo Park, CA (US)

(73) Assignee: LOOP COMMERCE, INC., Stamford, CT (US)

( * ) Notice: Subject to any disclaimer, the term of this patent is extended or adjusted under 35 U.S.C. 154(b) by 0 days.

(21) Appl. No.: 16/818,913

(22) Filed: Mar. 13, 2020

(65) Prior Publication Data
US 2020/0294110 A1    Sep. 17, 2020

Related U.S. Application Data

(60) Provisional application No. 62/817,815, filed on Mar. 13, 2019.

(51) Int. Cl.
| | |
|---|---|
| *G06Q 30/06* | (2012.01) |
| *G06Q 50/00* | (2012.01) |
| *G06F 3/0484* | (2013.01) |
| *G06F 3/0482* | (2013.01) |
| *G06Q 30/02* | (2012.01) |

(52) U.S. Cl.
CPC ....... *G06Q 30/0631* (2013.01); *G06F 3/0482* (2013.01); *G06F 3/0484* (2013.01); *G06Q 30/0252* (2013.01); *G06Q 30/0603* (2013.01); *G06Q 30/0633* (2013.01); *G06Q 50/01* (2013.01)

(58) Field of Classification Search
CPC .......... G06Q 30/0631; G06Q 30/0633; G06Q 50/01; G06Q 30/0603; G06Q 30/0252; G06F 3/0484; G06F 3/0482
See application file for complete search history.

(56) References Cited

U.S. PATENT DOCUMENTS

| | | | | |
|---|---|---|---|---|
| 2010/0125490 A1* | 5/2010 | Kiciman | ................ | G06Q 30/02 705/14.1 |
| 2014/0136997 A1* | 5/2014 | Spivack | ................. | H04L 51/32 715/753 |
| 2015/0100403 A1* | 4/2015 | Roberts | ............. | G06Q 30/0269 705/14.25 |

\* cited by examiner

*Primary Examiner* — Alexandru Cirnu
(74) *Attorney, Agent, or Firm* — Polsinelli

(57) ABSTRACT

Systems and methods for gift selection, attribution, and distribution are provided. The systems and methods may detect a gifting signal that is associated with an event corresponding to a recipient. The systems and methods can provide an option to generate a gift for the recipient. If the option is selected, the systems and methods can identify a set of product criteria associated with the event and the recipient. Based on the criteria, the systems and methods can obtain product selection options for the gift and provide these options to a gift sender. In response to a selection from the gift sender, the systems and methods can generate the gift, which includes a redemption option for the selection.

36 Claims, 16 Drawing Sheets

SYSTEMS AND METHODS FOR FACILITATING GIFT SELECTION, ATTRIBUTION, AND DISTRIBUTION

CROSS-REFERENCE TO RELATED APPLICATIONS

This application claims benefit from U.S. patent application Ser. No. 62/817,815, filed Mar. 13, 2019, which is incorporated in its entirety herein by reference.

BACKGROUND OF THE INVENTION

Currently gift selection and distribution can be limited and uninspired. Selecting a gift is normally done based on personal knowledge, which can often be incorrect or outdated. The ability to effectively gift give can have an overall effect on the customer experience. For example, receiving a gift that is unwanted or unrelated to the needs or preferences of a gift recipient can cause the recipient to not use or ignore the gift. There is, therefore, a need in the art for improved systems and methods that are capable of facilitating an effective gift selection, attribution, and distribution process.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Figure 1:
FIG. 1 shows an illustrative example of an environment in which a gift recommendation is presented in response to detection of a user-selected sentiment in accordance with at least one embodiment.
Figure 1:

FIG. 1 shows an illustrative example of an environment 100 in which a gift recommendation is presented in response to detection of a user-selected sentiment in accordance with at least one embodiment. More specifically, FIG. 1 illustrates an example graphical interface for queuing gift recommendations based on icons having a specific or implied meaning or sentiment (e.g., an emoji, which is a simple way to select an emotion quickly that can be conveyed via a graphical representation of the emotion). In some embodiments, messaging platforms can include an icon or emoji to enumerate one or more potential gift items that can be shared with other users, such as another person utilizing these messaging platforms. In these embodiments, after determining that a user has indicated, via a messaging platform, that a gift is to be sent to a recipient, one or more emojis can be presented via the graphical interface. These emojis can include a determination for the user such as asking the user to decide which sentiment they would like to share.

In an embodiment, an emoji can be associated with one or more gift recommendations that can correspond to an understood or well-known sentiment that the emoji represents. For example, when a heart emoji is selected, jewelry, chocolates, flowers, or other romantic-minded gifts may be presented via the graphical interface. In another example, when a laughing emoji is selected, a joke book, a prank gift, or another humorous gift may be presented via the graphical interface. In these embodiments, the product-based decision making can be removed from the gift selection process. Thus, if a user wants to express an emotion using a particular item, then the user can send one or more gifts that were recommended based on an emotion conveyed via selection of an emoji via the graphical interface.

In an embodiment, the messaging platforms are in communication with a gifting distribution system, which provides a catalog or other selection of items that can be selected as gifts based on the selected emoji. For instance, a messaging platform may transmit, to the gifting distribution system, a request to obtain information corresponding to products or product categories corresponding to the one or more emojis to be presented to the user via the graphical interface. In response to the request, the gifting distribution system may identify, from a catalog of available gift items, the different products and/or product categories that correspond to the available emojis or other sentiments specified by the messaging platform. In an embodiment, the gifting distribution system maintains, in a database or other repository, entries for each available product. Each entry may be associated with a particular emoji or sentiment. Thus, the gifting distribution system may provide, for each product and/or product category, an indication of an association between the product and/or product category with an emoji or sentiment. The messaging platform, based on the obtained products and/or product categories from the gifting distribution system, may present the user with a set of products and/or product categories corresponding to the selected emoji or sentiment.

In some embodiments, a history of one or more selections by a user causes the system to propose one or more emojis to a user for selection. Additionally, the system can enumerate one or more gift items (e.g., according to whether the user has selected a gift item in the past, or according to whom the user selected a gift item for in the past). In these embodiments, repeated selection of same or similar gift items can be avoided as needed based on the history of one or more previous selections by a user.

In some embodiments, the graphical interface can include a sponsored ad corresponding to the recommended gift. For example, a graphical interface can include a general suggestion for giving a "quick gift". In another example, a graphical interface can include a sponsored ad suggesting a gift of a "free frosty" or other item associated with a particular brand. Additionally, a sponsored ad can also include a brand logo or icon that is recognizable as associated with the sponsoring brand.

Figure 2:
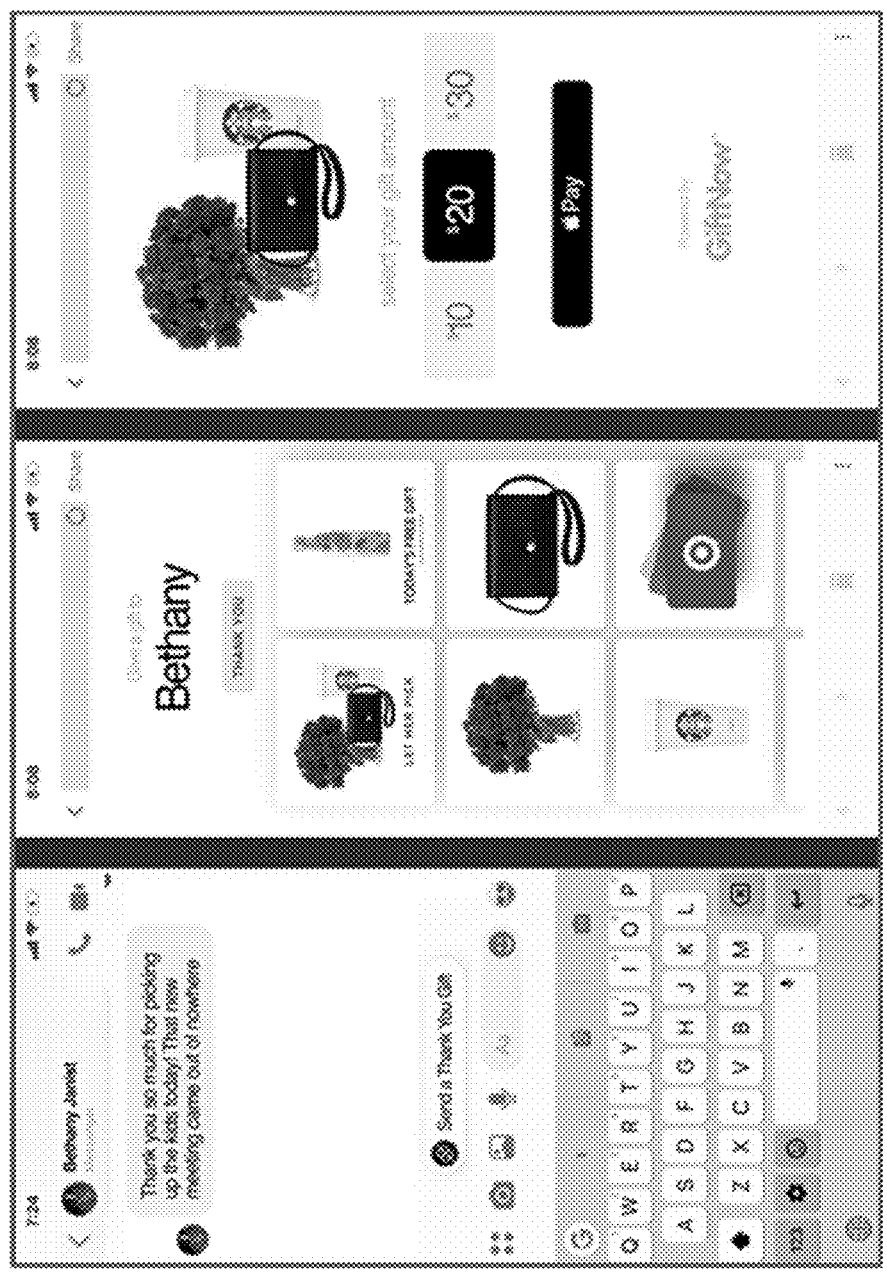
FIG. 2 shows an illustrative example of an environment in which a gift recommendation is presented in response to detection of a user sentiment via a message or correspondence from the user in accordance with at least one embodiment.

FIG. 2 shows an illustrative example of an environment 200 in which a gift recommendation is presented in response to detection of a user sentiment via a message or correspondence from the user in accordance with at least one embodiment. For example, a user or customer can be presented, via a graphical interface, gift suggestions that correspond to one or more sentiments expressed by the user or customer in a message or correspondence with another user. Using the gift suggestions, a user can select a gift that can be sent to a recipient that represents a sentiment (e.g., "thank you", "you're great", or "great work", etc.). Additionally, a gift can be associated with an intensity of emotion (e.g., a gift can represent a strong thank you or a weak thank you depending on the sentiment and the senders intent).

In these embodiments, the an application on a user device can use emotional gift intent prompting (e.g., based on user intent as noted in one or more words in a text message or other correspondence or social media posting), and one or more signals across one or more channels, to automatically identify when a consumer has expressed an emotion or intent. Additionally, the system can use emotional gift intent prompting to determine varying degrees of or changes to emotion or intent. In response to detecting an emotion or intent from the user, the application may transmit a request to the gifting distribution system to determine which products and/or product categories are associated with the detected emotion or intent from the user. In response to the request, the gifting distribution system may provide the various products and/or product categories corresponding to the detected emotion or intent. In some embodiments, the application maintains associations between different emotions or intents and products and product categories. Thus, the application, in these instances, may not be required to query a gifting distribution system to identify products and/or product categories associated with the detected emotion or intent.

In response to these signals, the application can prompt the user to select and/or request delivery of a recommended gift. Moreover, using the strength of the intent associated with the emotion or intent, the application can determine and/or display, via the graphical interface, one or more relevant gift suggestions (e.g., product, category, digital gift cards, promotion or coupons, sponsored products, experience, etc.), at a relevant price point (e.g., increasing the likelihood that the user will execute a selection).

In an embodiment, if the user selects a particular gift option from the gift suggestions presented via the graphical interface, the application can prompt the user for payment information that can be used to process payment for the selected gift. Additionally, the application may prompt the user to provide delivery information for the recipient. In some instances, the application may derive this delivery information from the messaging application, social media platform, or other source that provides the messaging interface between the user and the recipient. In response to obtaining the payment information from the user, the application may transmit the payment information and delivery information to the gifting distribution system, which may interact with a payment service corresponding to the provided payment information to determine whether the payment information is valid. If the payment information is valid, the gifting distribution system may transmit the gift to the recipient using the provided delivery information. It should be noted that in some instances, the payment information may be provided directly to a corresponding payment service by the application, which may then receive an indication as to whether the payment information provided is valid or not. If the payment information is not valid, the request to send the gift may be denied or, otherwise, the user may be notified, via the application, that its payment information was not accepted.

Figure 3:
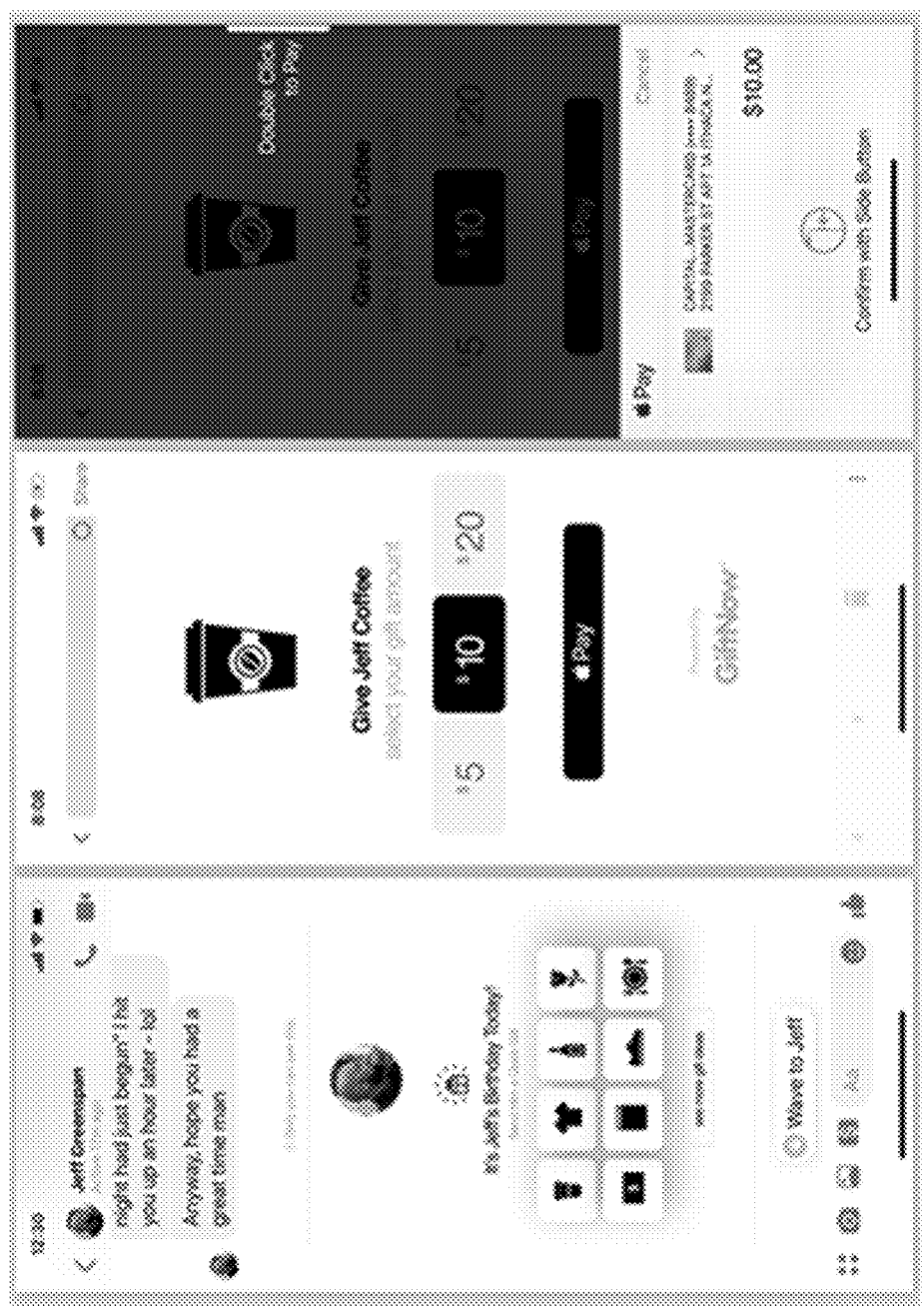
FIG. 3 shows an illustrative example of an environment in which a gift recommendation is presented in response to detection of an event associated with a potential recipient in accordance with at least one embodiment.

FIG. 3 shows an illustrative example of an environment 300 in which a gift recommendation is presented in response to detection of an event associated with a potential recipient in accordance with at least one embodiment. In an embodiment, a contextual trigger (e.g. an indication of a birthday in a social media environment or context) can be used to automatically generate a curated selection of gifts. For instance, if the gifting application detects, from the social media application operating on a user's device, that a friend or other person the user is communicating with is the subject of an event (e.g., birthday, anniversary, graduation, etc.), the gifting application may present the user, via the graphical interface, with various gift options and/or categories corresponding to the detected event. In some embodiments, in response to detecting such an event, the gifting application transmits an indication of this event to a gifting distribution system, which can provide appropriate gift options and/or categories that can be presented to the user via the graphical interface.

Event notifications can be a closed loop on social media platforms. Thus, in a social media context, an event notification can be an indication that a potential recipient is the subject of the event, the user gets a reminder, the user sends a note, and the potential recipient may or may not respond back. In these embodiments, the ability to power a curated selection of gifts at various price points can be facilitated. Additionally, this ability can enhance the emotional engagement of a communication is enhanced, as this type of gesture can stand out as significant to the recipient, which can enable a deeper connection between a sender and a recipient.

In an embodiment, if a gift is selected from a curated set, the gift can be paid for using the same graphical interface. For instance, as illustrated in FIG. 3, the user may be presented with a payment option that is linked to a user's payment information. This payment information may be transmitted to the gifting distribution system or to a payment provider, which may verify the provided payment information and determine whether the payment information is valid. As described above, if the payment information is valid, the payment is processed and the selected gift is transmitted to the recipient using delivery information associated with the recipient (e.g., social media platform identifier, e-mail address, physical mailing address, etc.). However, if the provided payment information is not valid, the request to provide a gift to the recipient may be denied and/or the user may be notified that the payment information provided is not valid.

Figure 4:
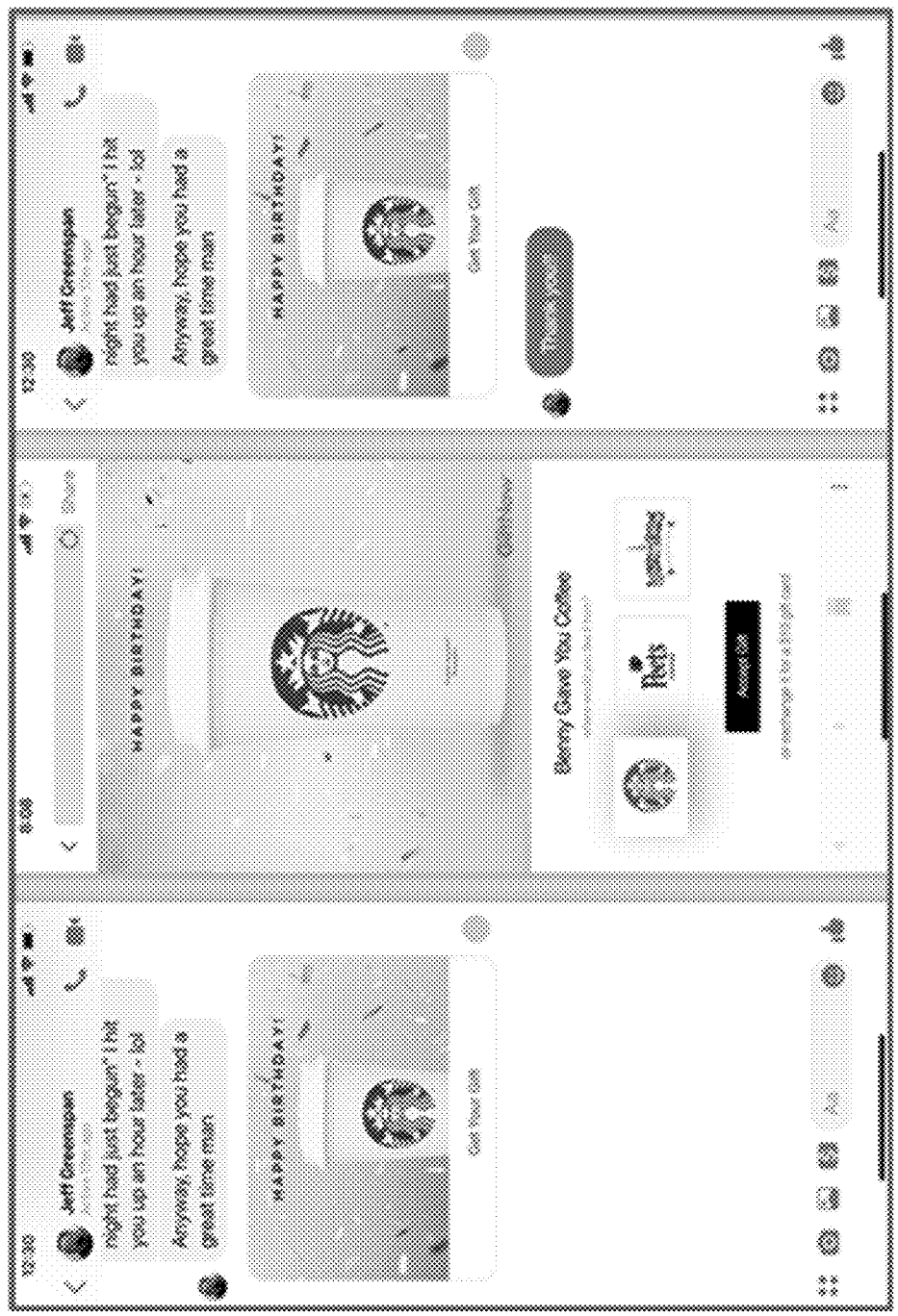
FIG. 4 shows an illustrative example of an environment in which a recipient is presented with gift selection options in response to obtaining a gift from a sender in accordance with at least one embodiment.

FIG. 4 shows an illustrative example of an environment 400 in which a recipient is presented with gift selection options in response to obtaining a gift from a sender in accordance with at least one embodiment. In an embodiment, the ability for a recipient to receive and select a gift from a limited set of curated and relevant options is further facilitated based on an event. This embodiment is similar to what is depicted in FIG. 3 above, and additionally, this embodiment allows a recipient to select, via the graphical interface, from one or more gift options. For example, a recipient can initially receive a gift card from a first coffee company and then be presented with the option to select a different coffee company for redemption of the gift card.

In an embodiment, when the recipient selects the digital representation of the gift card via the messaging application, a request is transmitted to the gifting distribution system to identify any available alternatives to the primary gift associated with the gift card. For instance, when a sender of the gift card generates the gift card, the gifting distribution system may identify similar gifts having a similar value to that of the gift selected by the sender. The gifting distribution system may maintain an association between the particular gift (e.g., gift card) and these alternatives that may be presented to the recipient upon selection of the gift. In some instances, the sender may identify one or more of these possible alternatives that may be presented to the recipient. Alternatively, if the sender does not identify possible alternatives to the gift, the gifting distribution system may automatically identify these possible alternatives based on one or more characteristics of the selected gift (e.g., product category, price range, manufacturer, product source (e.g., store, brand, and the like), etc.). In some instances, the sender may select, instead of a specific gift, a product category. From this product category, the gifting distribution system may present, via the graphical interface, various products associated with the product category that the recipient may select as its gift.

Figure 5:
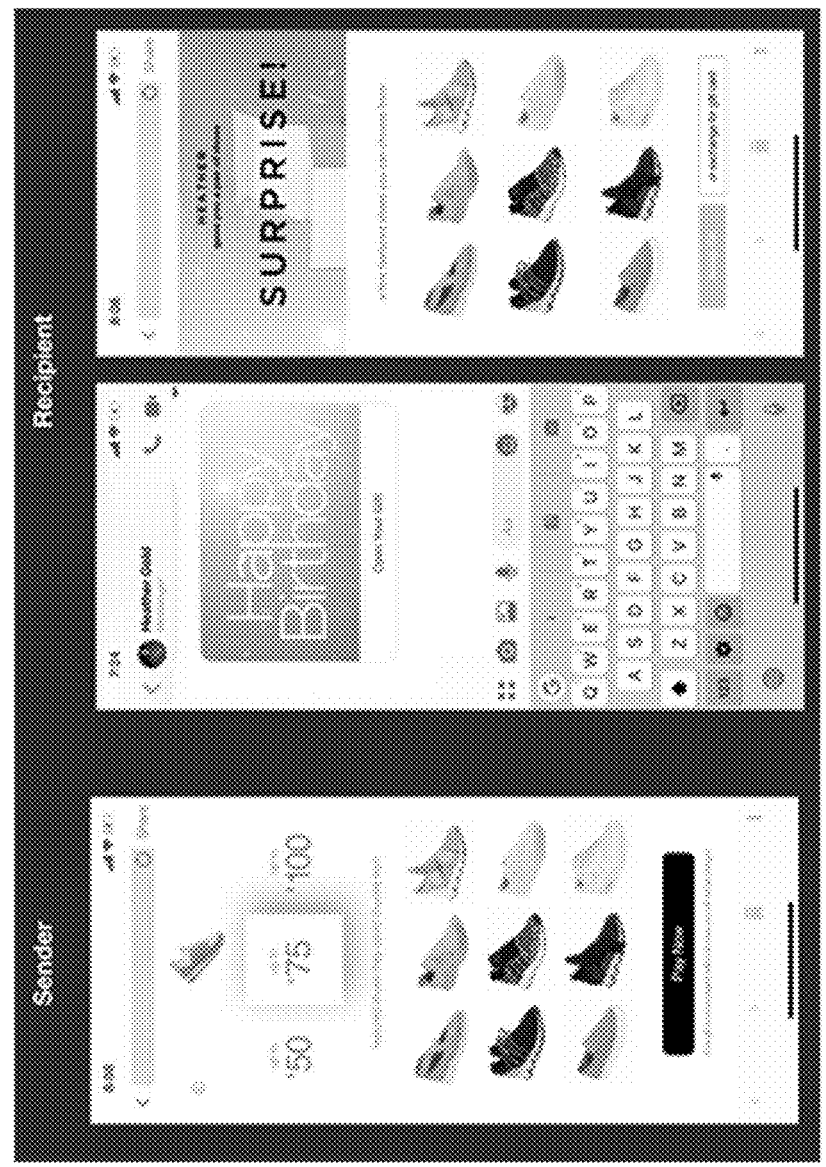
FIG. 5 shows an illustrative example of an environment in which a recipient of a gift is presented with various gift options corresponding to a gift value selected by a sender in accordance with at least one embodiment.

FIG. 5 shows an illustrative example of an environment 500 in which a recipient of a gift is presented with various gift options corresponding to a gift value selected by a sender in accordance with at least one embodiment. In certain embodiments, product gifting can be facilitated with a limited amount of knowledge about the recipient (e.g., without knowledge of a recipient's color or size preference). In these implementations, category (or product) gifting can allow a gift sender to select a category (e.g., a shoe, cup of coffee, or an experience), and pay for a gift. For instance, via a gifting application, a user may select a particular product category from which a recipient may select a product as a gift from the user. Via this gifting application, the user may select a gift value, which may be used to identify the products that may be made available to the recipient for selection as a gift from the user.

In an embodiment, the user can select, from the gifting application, the product category from which a recipient may select a gift from the user. These product categories may be provided by the gifting distribution system, which may populate the gifting application with different product categories for selection by the user via the graphical interface. In some instances, the gifting application may present particular product categories based on a sentiment, emoji, or other indication as described above. If the user selects a particular product category, the gifting application may present the user with an option to select a price range or limit for the gift. Based on the specified price range or limit, the user may presented with various gift options that may be presented to the recipient for the recipient's selection. Further, the user may be presented with different payment options, through which the user may provide its payment information.

In an embodiment, when a gift recipient accepts a gift, the gift recipient is presented with a curated collection of specific products from the product category selected by the sender or otherwise fit the price point of what the gift sender paid. In these embodiments, visibility as to the cost of the gift can be limited or restricted such that the recipient cannot see the price. Additionally, in some embodiments, a gift recipient can exchange a gift across different merchants or retailers. For example, a gift recipient can receive a gift (e.g., in the form a gift card, a voucher, or a coupon), from a first merchant but choose to redeem that gift from a different merchant that also carries the same or similar goods. In an embodiment, any products from the product category selected that are not in stock or are otherwise unavailable are hidden from view or are otherwise not presented to the gift recipient. In another example, if a particular product selected by the sender is unavailable, the gift recipient may be presented with other products of the same product category as the unavailable product. These other products may be of equal or similar value to that of the unavailable product.

Figure 6:
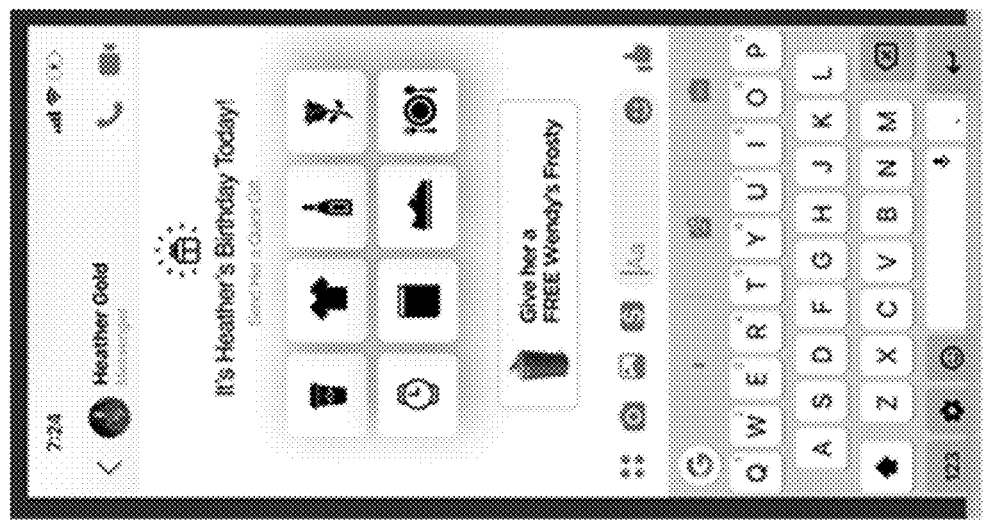
FIG. 6 shows an illustrative example of an environment in which a sender is presented with one or more gift selection categories and a sponsored gift selection option in accordance with at least one embodiment.

FIG. 6 shows an illustrative example of an environment 600 in which a sender is presented with one or more gift selection categories and a sponsored gift selection option in accordance with at least one embodiment. In some implementations, a sponsored gift can be included in any and all of the graphical interfaces or gift situations described herein. Additionally, in these implementations, any social media platform (or network of partners and merchants), can sponsor an ad that can facilitate showcasing a gift or item on that social media platform (e.g., causing that gift or item to stand out). For instance, a social media platform may provide, to the gifting distribution system, one or more sponsored gift options that may be presented to users making gift selections via the social media platform. Thus, if the gifting application operating in the background of a social media application of the social media platform detects that a user wants to generate a gift for a recipient, the gifting application may obtain, from the gifting distribution system, various sponsored gift options as indicated by the social media platform. The gifting application may presented these sponsored gift options in addition to any other products and/or product categories that the user may select as possible gifts for a recipient.

Figure 7:
FIG. 7 shows an illustrative example of an environment in which a recipient obtains a brand-related automated gift voucher or gift associated with a loyalty program in accordance with at least one embodiment.

FIG. 7 shows an illustrative example of an environment 700 in which a recipient obtains a brand-related automated gift voucher or gift associated with a loyalty program in accordance with at least one embodiment. In the environment 700, a recipient may obtain a brand-related gift in response to a specific customer situation associated with the brand. Customer situations can include, but are not limited to, resolving a customer care situation (e.g., lost luggage), and/or rewarding a customer for its loyalty (e.g., customer mileage milestones, spending milestones, customer referrals, etc.). In an embodiment, when the recipient selects the brand-related gift presented via the graphical interface, the recipient is presented with various products from which the recipient may select a gift. For instance, in response to recipient selection of the brand-related gift via the graphical interface, the application may transmit a request to the gifting distribution system to identify one or more products and/or categories associated with the brand-related gift generated by the brand. For instance, based on the brand associated with the brand-related gift, the gifting distribution system may identify one or more products and/or product categories associated with the brand (e.g., products generated by the brand, products designated by the brand as being available for recipients, etc.). In some instances, brands may associate distinct values to each of the products that may be made available to recipients. Thus, the gifting distribution system may provide, via the graphical interface, products that may be selected corresponding to the value indicated by the brand in the brand-related gift.

Figure 8:
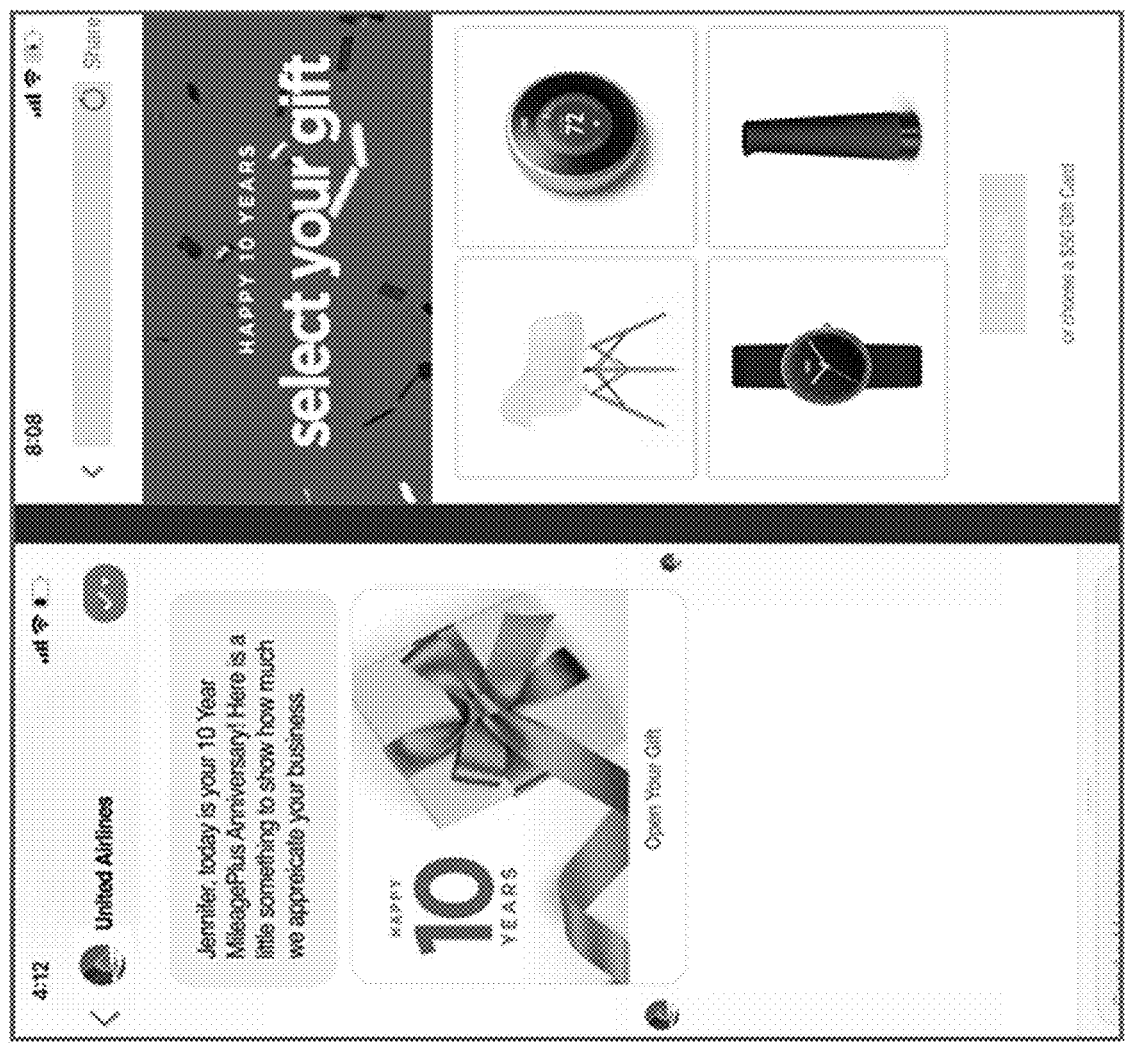
FIG. 8 shows an illustrative example of an environment in which a recipient obtains a brand-related automated gift voucher or gift associated with a loyalty program in accordance with at least one embodiment.

FIG. 8 shows an illustrative example of an environment 800 in which a recipient obtains a brand-related automated gift voucher or gift associated with a loyalty program in accordance with at least one embodiment. In the environment 800, a brand may provide a brand-related gift to a recipient based on a recipient milestone (e.g., an anniversary with the brand, etc.). The brand-related gift presented to the recipient, as illustrated in FIG. 8, may not include an indication of the value of the brand-related gift but rather the milestone achieved by the recipient. In an embodiment, the brand indicates, to the gifting distribution system, products and/or product categories that are associated with different customer milestones. Alternatively, the brand may associate, via the gifting distribution system, values with corresponding customer milestones. These values may be used by the gifting distribution system to determine what products and/or product categories may be presented to recipients based on the milestones achieved by these recipients and indicated in the brand-related gifts.

In some implementations, brand incentives can motivate an action. For example, a fast food chain can offer an item (e.g., fries) at a given time to users who do something kind for someone else. In these implementations, this offer can be followed by a thank you note to the brand from the consumer. Brand sponsored gifting can allow a brand to digitally gift and deliver items to one or more people. Deliverable items can include, but are not limited to, a sponsored product, a category, a digital gift card, an experience, a promotion, or a coupon. In some embodiments, because a product is sent virtually, a brand does not have to manage inventory. In these embodiments, as a gift gets claimed by a consumer and converted into a physical item, the system described herein can automatically and dynamically manage how many of the gifts can be accepted and expire any unclaimed gifts.

Additionally, in some embodiments, both unclaimed and claimed gifts can be set to expire. This can allow a brand to effectively manage the cost of any sponsored gift campaign. For example, the brand gifting described herein could be triggered off a social media page or account corresponding to a brand and available to visitors. In these embodiments, when a customer or recipient sends a thank you (e.g., in response to receiving a gift or gift selection option), the interaction data can be used by the brand (e.g., to inject fresh content into their social media pages, to gauge sentiment, etc.).

Figure 9:
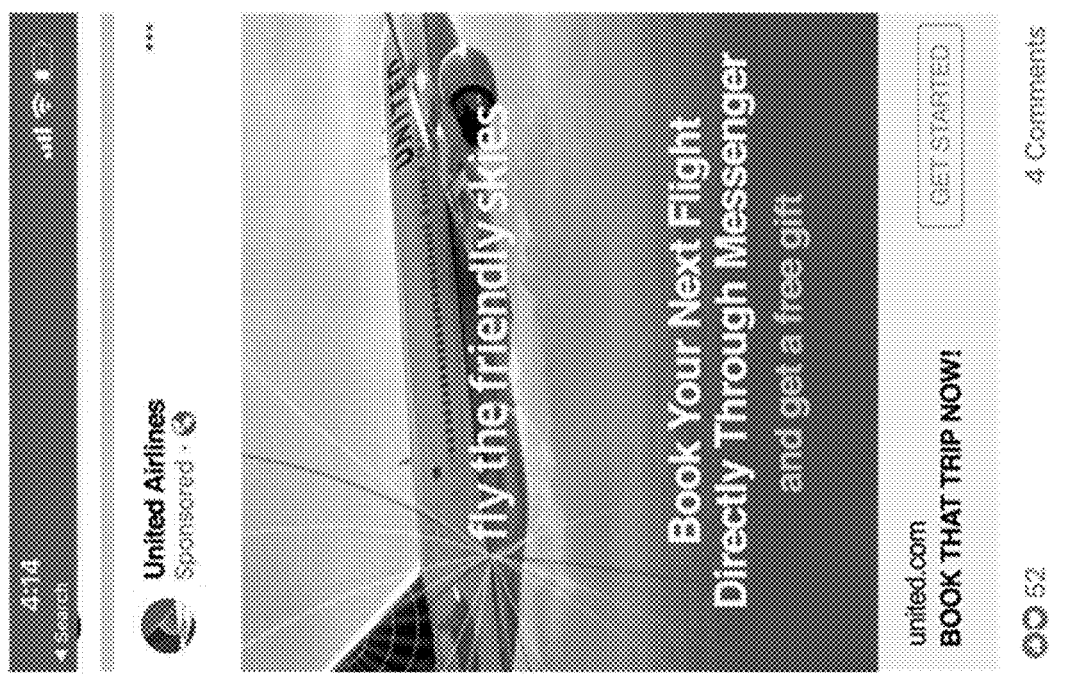
FIG. 9 shows an illustrative example of an environment in which a recipient is presented with an advertisement that includes a brand-related incentivized loyalty program option in accordance with at least one embodiment.

FIG. 9 shows an illustrative example of an environment in which a recipient is presented with an advertisement that includes a brand-related incentivized loyalty program option in accordance with at least one embodiment. In these implementations, within a marketplace of gifts, a gift with purchase can be automatically sent without brand interaction (e.g., brand fulfillment). For instance, if a user fulfills the requirements set forth in the advertisement, the user may be presented with one or more gift options by the gifting distribution system via the graphical interface. The one or more gift options may be initially selected by the brand when generating the advertisement. For instance, the brand may associate a set of products and/or product categories with the advertisement. Thus, the advertisement may be associated with these one or more products and/or product categories, from which a user may select a gift.

Figure 10:
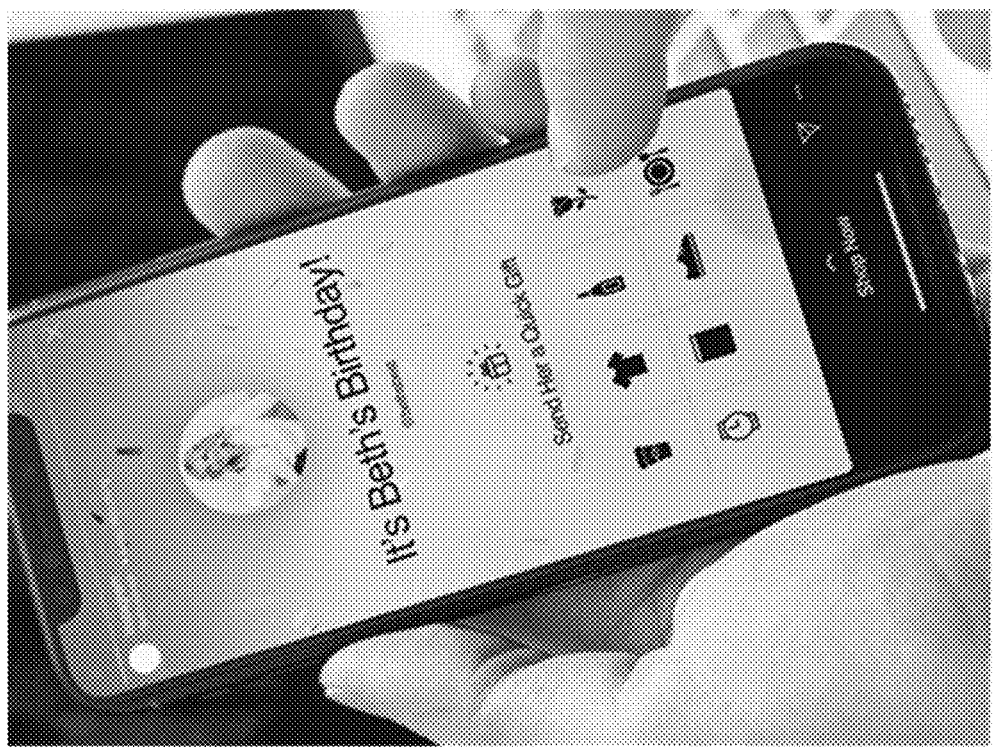
FIG. 10 shows an illustrative example of an environment in which a user is presented with various gift recommendations for a recipient in response to an event associated with the recipient indicated via a social media platform in accordance with at least one embodiment.

FIG. 10 shows an illustrative example of an environment 1000 in which a user is presented with various gift recommendations for a recipient in response to an event associated with the recipient indicated via a social media platform in accordance with at least one embodiment. In some implementations, a gift recommendation can be associated with an event (e.g., a birthday, an anniversary, etc.). For example, a gift given through a social media platform (e.g., on a social media page) can include a reminder (e.g., for an occasion reminder such as a birthday or anniversary). In these implementations, selection of one or more products at a specific price can be facilitated (as noted herein above). Additionally, curated products (and ads) can be automatically included in a recipient social media feed.

Figure 11:
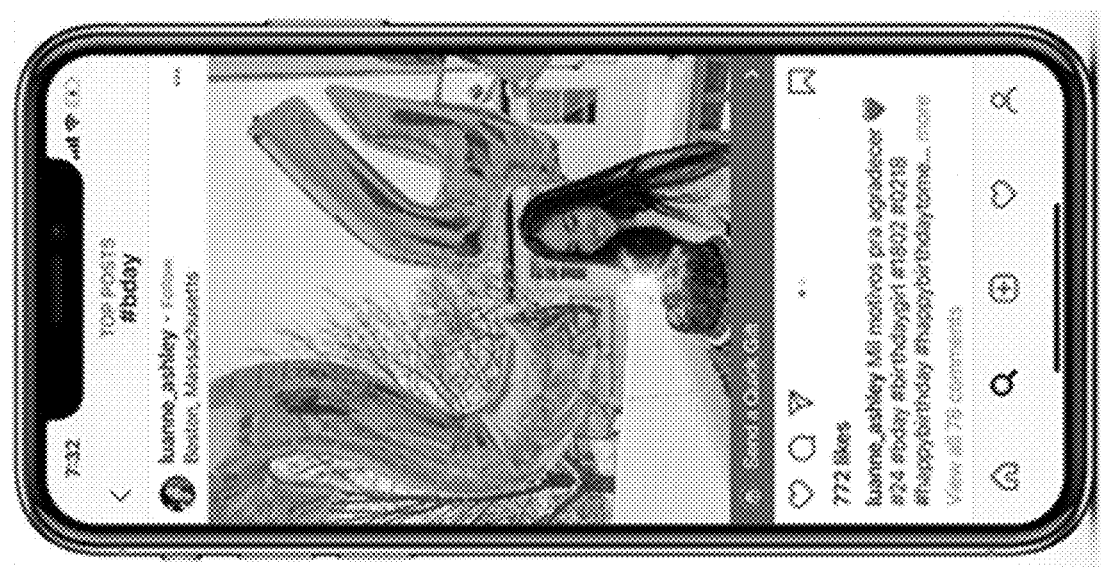
FIG. 11 shows an illustrative example of an environment in which a gift recommendation is presented using social media and tagging in accordance with at least one embodiment.

FIG. 11 shows an illustrative example of an environment 1100 in which a gift recommendation is presented using social media and tagging in accordance with at least one embodiment. In some implementations, a social media platform can be used to facilitate gifting (e.g., using specially tagged posts). In these implementations, gifting opportunities can be automatically detected and facilitated using user behavior (e.g., a hashtag or other type of post). For instance, a gifting application may detect, from a social media post, a hashtag or other type of content that may be associated with a particular event or milestone for a possible recipient (e.g., a birthday, an anniversary, etc.). In response to detecting a hashtag or other type of content associated with a particular event or milestone, the gifting application may present the user, via the graphical interface, with an option to deliver a gift to the possible recipient that is the subject of the social media post. Selection of this option may cause the gifting application to present the user with various products and/or product categories that may be provided to the recipient, as described in detail above.

Figure 12:
FIG. 12 shows an illustrative example of an environment in which a gift advertisement is presented to enable use of a gifting application to select a gift for delivery to a recipient in accordance with at least one embodiment.

FIG. 12 shows an illustrative example of an environment 1200 in which a gift advertisement is presented to enable use of a gifting application to select a gift for delivery to a recipient in accordance with at least one embodiment. In the environment 1200, a physical advertisement may be presented at a point of sale that includes a Quick Response (QR) code, bar code, or other object that, when scanned using a mobile device, causes the mobile device to execute a gifting application for generating a gift for a recipient. In an embodiment, if the mobile device does not have the gifting application installed, the mobile device may obtain the application from the gifting distribution system or other application distribution system. For instance, the scannable object (e.g., QR code, etc.) may correspond to a hyperlink or other network address of a network location where the gifting application may be obtained.

In an embodiment, if the mobile device has installed the gifting application, scanning of the object may cause the gifting application to present to the user, via a graphical interface, options for sending a gift to a particular recipient. For instance, the scannable object may be associated with a particular item or set of items at the point of sale. For instance, the scannable object may be associated with a particular sweater provided by a retailer and sold at the point of sale. From the gifting application, the user may select which item to provide as a gift as well as other options for the item (e.g., size, color, etc.). In some instances, the gifting application may alternatively present the user with various products and/or product categories corresponding to items sold at the point of sale or by the retailer that provides the point of sale. For instance, in response to scanning the object, the gifting application may transmit a request to the gifting distribution system to identify the products and/or product categories made available at the point of sale or retailer that provides the point of sale.

Through the gifting application, the user may select a product and/or product category that may be presented as a gift to a particular recipient. Further, the user may provide delivery information for the gift (e.g., e-mail address of the recipient, a physical address of the recipient, etc.) as well as payment information. In some embodiments, the user can provide payment information for the gift at the point of sale, whereby a confirmation may be provided to the gifting distribution system. In response to this confirmation, the gifting distribution system may deliver the gift to the recipient.

Figure 13:
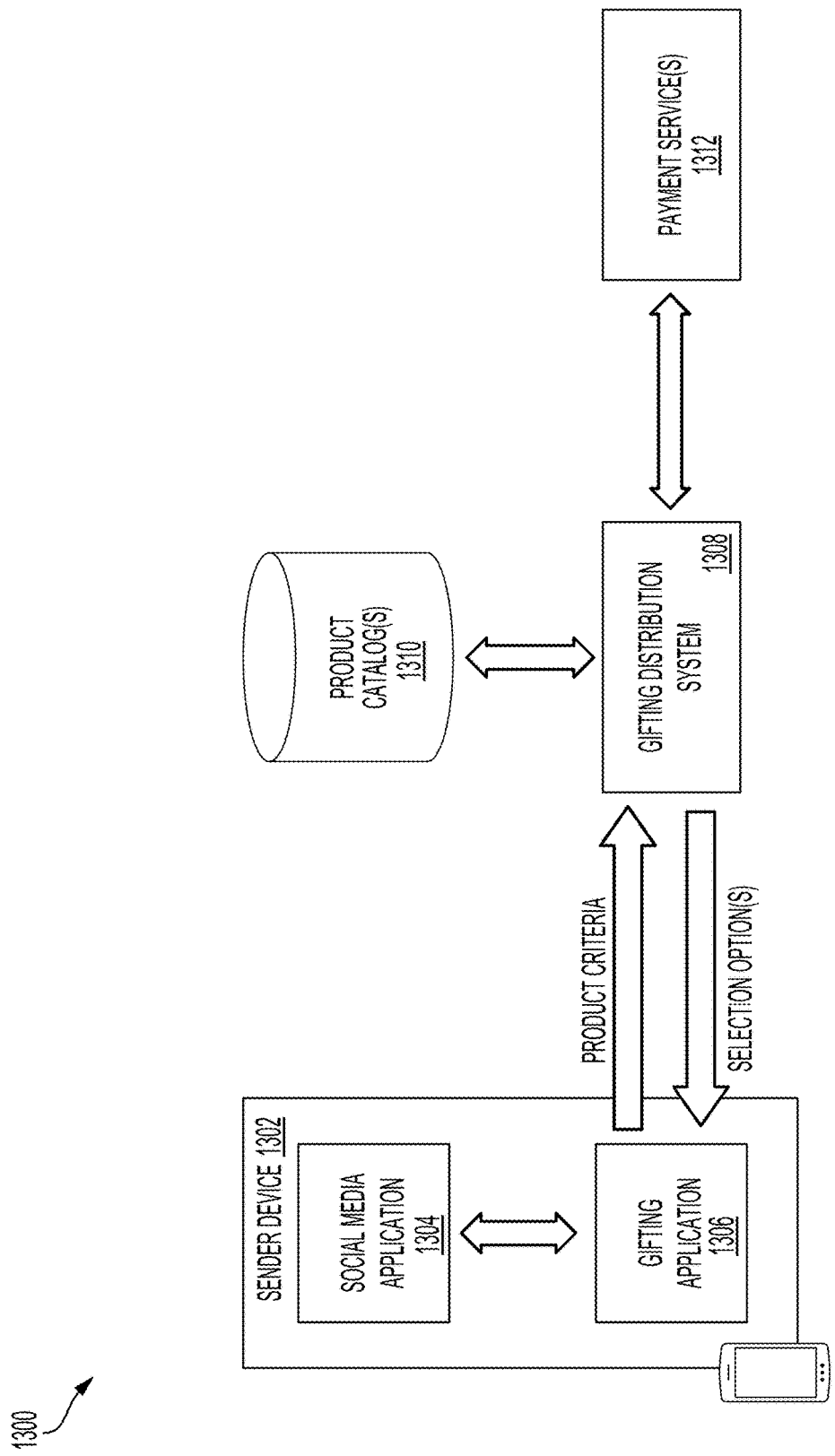
FIG. 13 shows an illustrative example of an environment in which a gifting distribution system provides gifting options to a gifting application based on product criteria identified based on indications from social media platforms and from users in accordance with at least one embodiment.

FIG. 13 shows an illustrative example of an environment 1300 in which a gifting distribution system 1308 provides gifting options to a gifting application 1306 based on product criteria identified based on indications from social media platforms and from users in accordance with at least one embodiment. In the environment 1300, a sender device 1302 executes a social media application 1304 and a gifting application 1306 that can be utilized to generate a gift that can be distributed to a particular recipient as designated by a user of the sender device 1302. In an embodiment, the gifting application 1306 operates as a process (e.g., plug-in, etc.) operating in conjunction with the social media application 1304. For instance, the gifting application 1306 may function to monitor interactions between the user of the social media application 1304 and other users of the social media platform associated with the social media application 1304. The social media application 1304, for example, may be a messenger application that enables a user of the sender device 1302 to communicate digitally (e.g., text, video, voice, etc.) with other users of the social media platform.

In an embodiment, the gifting application 1306 obtains an indication from the social media application 1304 of an event associated with a possible recipient for which the user of the sender device 1302 may want to send a gift to the possible recipient. For instance, based on a social media post presented via the social media application 1304, the gifting application 1306 may determine that it is the birthday of the subject of the social media post. In response to this indication of a giftable event, the gifting application 1306 may present the user of the sender device 1302, via a graphical interface, with an option to send a gift to the subject of the social media post. If the user selects this option, the gifting application 1306 may transmit a request to a gifting distribution system 1308 to determine what products and/or product categories may be available for delivery to the subject of the social media post. In an embodiment, the gifting application 1306 can provide, in the request, contextual information corresponding to the detected event, as well as information about the user of the sender device 1302 and of the subject of the social media post, to the gifting distribution system 1308. This contextual information may be used by the gifting distribution system 1308 to recommend possible products and/or product categories that may be provided as gifts to the subject of the social media post. The contextual information may include the event detected by the gifting application 1306 (e.g., birthday, anniversary, milestone, etc.), information about the user of the sender device 1302 (e.g., name, addresses, past gifting or purchase history, etc.), and information about the possible recipient (e.g., name, addresses, previous gifts sent by the user to the possible recipient, etc.).

In response to obtaining the request from the gifting application 1306, the gifting distribution system 1308 may evaluate the contextual information provided in the request to identify possible products and/or product categories that may be presented to the user of the sender device 1302 for selection as a possible gift for the subject of the social media post. For instance, the gifting distribution system 1308 may access a product catalog repository 1310 to identify these possible products and/or product categories. The product catalog repository 1310 may include a database that includes entries corresponding to individual products as well as to individual product categories associated with one or more products. Each entry may be categorized based on brand, sentiment, event, price, and the like. Thus, based on the contextual information provided by the gifting application 1306, the gifting distribution system 1308 may identify products and/or product categories that may be presented to the user of the sender device 1302 by the gifting application 1306.

The gifting distribution system 1308 may transmit the selection options to the gifting application 1306 in response to identify a set of products and/or product categories that may be available for gifting to the subject of the social media post. In response to obtaining these selection options, the gifting application 1306 may present the user of the sender device 1302, via the graphical interface, with these selection options. Via the graphical interface, the user of the sender device 1302 may select a product that may be given to the recipient (e.g., subject of the social media post) as a gift. Alternatively, the user may select a product category from which the recipient may select a product as a gift from the user. In some instances, the user may also identify possible alternatives that may be presented to the recipient should the recipient prefer an alternative to the gift selected by the user.

For instance, if the user selects a particular brand of coffee that is to be given to the recipient, the user may select other brands of coffee from which the recipient may select its gift from.

In an embodiment, if the social media platform that provides the social media application has engaged the gifting distribution system 1308 to provide sponsored gift ideas to users of the social medial application 1304 when presenting possible products and/or product categories to users, the gifting distribution system 1308 may provide these sponsored gift ideas to the gifting application 1306. The gifting application 1306 may present these sponsored gift ideas in addition to any identified products and/or product categories indicated by the gifting distribution system 1308.

Through the graphical interface, a user can designate an amount that can be allocated for selection of a gift by the recipient of the gift. For instance, if the user of the sender device 1302 sets a maximum amount that can be allocated for a gift, the gifting distribution system 1308 can identify a set of products that are valued at or below the maximum amount specified by the user of the sender device 1302. This set of products may be presented to the user via the gifting application 1306 in order to allow the user to determine whether the products would be acceptable as gifts for the recipient. If not, the user may set a different amount that can be allocated for a gift.

In an embodiment, through the gifting application 1306, the user of the sender device 1302 can provide payment information that may be used for payment of a gift for the recipient. For instance, as illustrated in FIG. 3, the user may utilize a mobile payment service or digital wallet (e.g., Apple Pay®, etc.) to provide payment for the gift. Alternatively, the user may provide credit card information, online payment system information, banking information, money transfer information, and like that may be used to obtain payment for the gift. The gifting application 1306 may provide the payment information to the gifting distribution system 1308, which may communicate with a corresponding payment service 1312 to authenticate the payment information. If the payment information is valid and payment can be made for the gift, the payment service 1312 may provide the gifting distribution system 1308 with the requisite payment. However, if the payment information cannot be validated, the gifting distribution system 1308 may transmit a notification to the gifting application 1306 that the request to send a gift to the recipient could not be completed. The gifting application 1306 may prompt the user to provide another form of payment or alternative payment information. Alternatively, the gifting application 1306 may terminate the request.

In an embodiment, the gifting distribution system 1308 transmits the gift to the recipient via the social media platform through which the user of the sender device 1302 and the recipient are communicating. Alternatively, if the user has provided an electronic address of the recipient, the gifting distribution system 1308 may transmit the gift to the recipient via this electronic address. A recipient receiving the gift may be presented with a redemption code or other information that may used to redeem the gift provided therein. For instance, if the gift is a gift card for a particular store, the recipient may redeem the gift card at the store (e.g., online storefront, etc.). In an embodiment, if the sender has indicated that the gift can be exchanged for other products of equal or similar value, the recipient may be presented, via a gifting application or website viewable from a recipient device, with various product options that are of equal or similar value to the original product selected by the user. For example, as illustrated in FIG. 4, a recipient may be presented with various brands of coffee as an alternative to the brand selected by the sender. This enables the recipient to select a product of its choice if the recipient does not want to receive the product originally selected by the sender. The alternatives presented to the recipient may be selected based on the product category of the original product selected by the sender. Alternatively, the alternatives may be selected based on the value of the original product selected by the sender.

The gifting distribution system 1308 may maintain, for each gift made available to a recipient, a database entry corresponding to the gift. For instance, when a recipient selects a gift presented to the recipient from a sender, the recipient device may be directed to the gifting distribution system 1308, whereby the gifting distribution system 1308 may identify the product and/or product category associated with the gift. Further, the gifting distribution system 1308 may identify any sender preferences that may be used to determine how the product and/or product categories associated with the gift are to be presented to the recipient. For instance, if a sender has opted to hide the value of the gift from the recipient via the gifting application 1306, the recipient may be presented with various gift options that have a value equal to or less than the value set forth by the sender. The recipient may select a product from these gift options without being presented with the corresponding value of the product. As another example, the recipient may be presented with alternative products in the same category of the product selected by the sender as the gift for the recipient.

Figure 14:
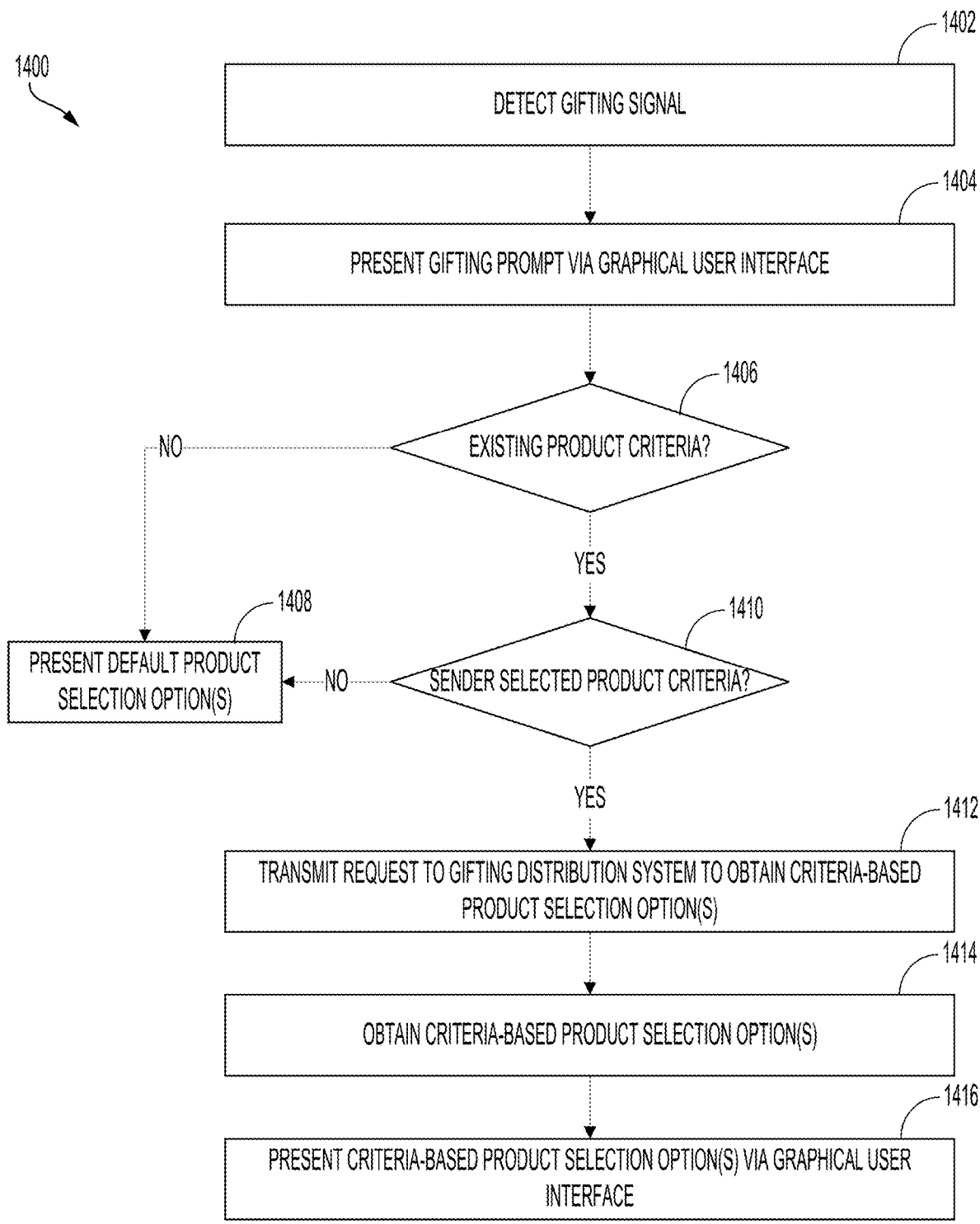
FIG. 14 shows an illustrative example of a process for presenting product selection options for generating a gift for a recipient in accordance with at least one embodiment.

FIG. 14 shows an illustrative example of a process 1400 for presenting product selection options for generating a gift for a recipient in accordance with at least one embodiment. The process 1400 may be performed by a gifting application executing on a computing device, such as a mobile device. The gifting application may be operating in conjunction with a social media application or other application on the computing device that enables communication between a user of the computing device and other entities. For instance, the gifting application may monitor communications and posts made and/or received via the social media application.

At step 1402, the gifting application may detect a gifting signal. A gifting signal may include a sentiment of the user of the computing device with regard to an action performed by a possible recipient. For instance, through a social media application, a user may indicate that it is grateful to the recipient for performing an action. The gifting application may determine that this sentiment is a gifting signal that may serve as an indication that the user may be likely to want to send a gift to the recipient. Another example of a gifting signal is an event associated with the recipient that is typically associated with the presentation of gifts. This event may include a birthday, an anniversary, a milestone (e.g., retirement, career service time, graduation, promotion, etc.), and the like.

In response to detecting a gifting signal, the gifting application, at step 1404, may present a gifting prompt to the user of the computing device via a graphical user interface. For instance, the gifting application may generate an iFrame, pop-up window, banner, or other interface element that prompts the user to indicate whether it wants to send a gift to a recipient (e.g., person to whom the user is communicating, person whose post the user is reviewing, etc.). In an embodiment, in response to the gifting signal, the gifting application obtains product and/or product category information that can be presented to the user via the gifting prompt. This may allow the user to select a product or product category that can be delivered as a gift to the recipient.

In an embodiment, the gifting application can identify certain product criteria associated with the recipient. For instance, the gifting application may identify one or more characteristics of the possible recipient that may be used to identify a set of products and/or product categories that may be appealing to the recipient. As an example, the gifting application may transmit information associated with the recipient to the gifting distribution system, which may maintain detailed information and preferences for different entities, including the recipient. The gifting distribution system may identify, based on this detailed information and preferences for the recipient, what products and/or product categories may be of interest to the recipient. These preferences may be determined based on previous gifts selected by the recipient, activities identified through a recipient profile, and the like. This information may be provided to the gifting application in the form of existing product criteria. Thus, at step 1406, the gifting application may determine whether there are any existing product criteria for the possible recipient. If the gifting application determines that there are no existing product criteria, the gifting application may, at step 1408, present a set of default product selection options. These options may be selected based on the particular event or sentiment detected by the gifting application.

In an embodiment, if the gifting application identifies one or more existing product criteria for the recipient, the gifting application, at step 1410, determines whether the sender has specified any product criteria. For instance, through the gifting application, the sender may identify a set of criteria that may be used to identify particular products and/or product categories from which the sender may select a gift for the recipient. Alternatively, the sender may select an existing product criteria corresponding to the recipient, which the gifting application may associate with a particular set of products and/or product categories that may be presented to the recipient. In some embodiments, the sender can specify a gift value that can be used to identify products of equal or lesser value that can be presented to the recipient for selection. In an embodiment, if the sender does not select any products or product categories, the gifting application may, at step 1410, present the default product selection options as described above.

In an embodiment, at step 1412, the gifting application transmits a request to the gifting distribution system to obtain criteria-based product selection options. For instance, the gifting application may provide the existing product criteria for the recipient, as well as any criteria specified by the sender that may be used to identify appropriate products and/or product categories that can be presented to the sender. The gifting application may obtain, at step 1414, the criteria-based product selection options from the gifting distribution system. These product selection options may be selected by the gifting distribution system based on the various criteria identified and provided by the gifting application. In response to obtaining these selection options, the gifting application may, at step 1416, present these criteria-based product selection options to the sender via the graphical user interface.

Figure 15:
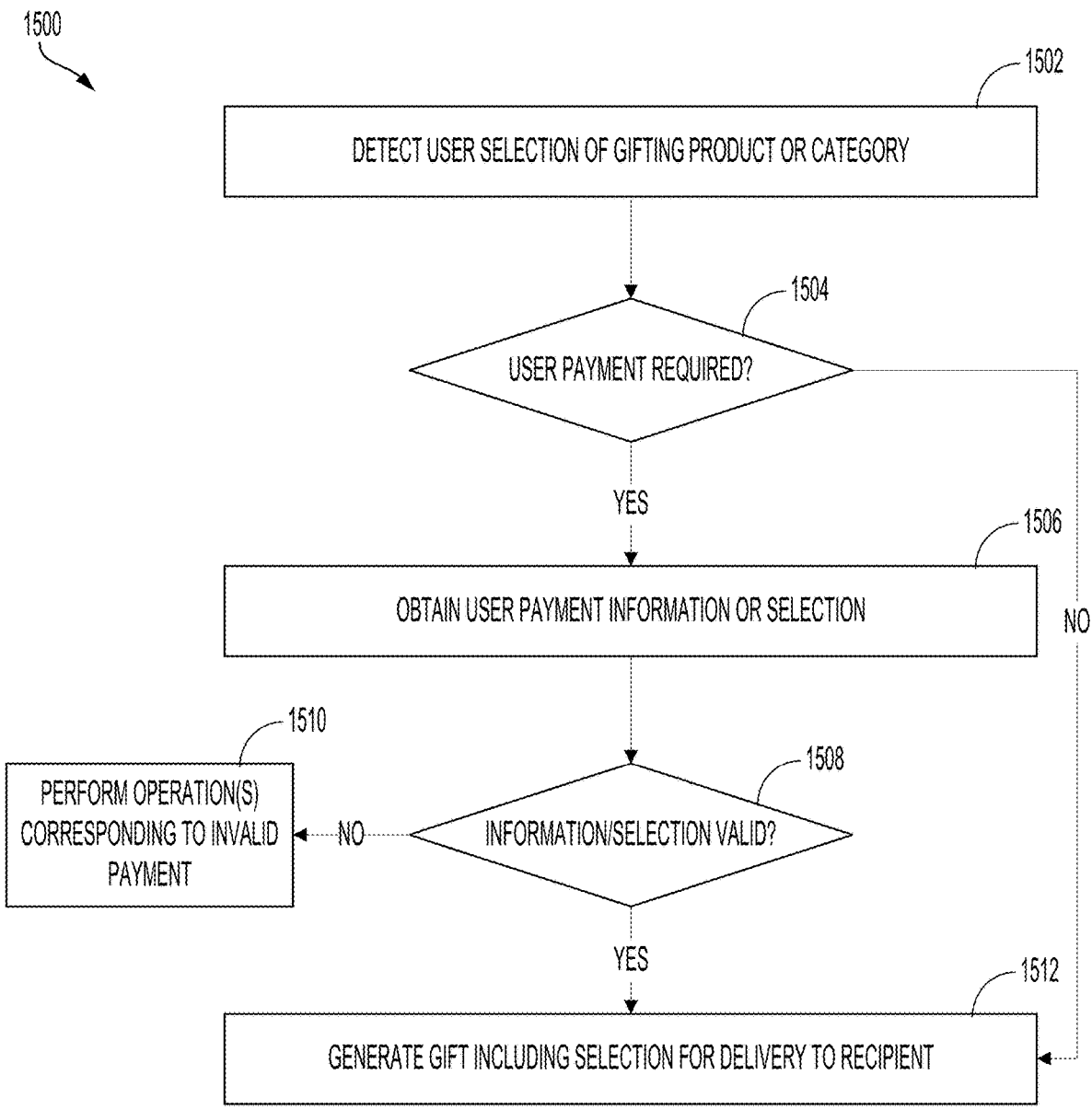
FIG. 15 shows an illustrative example of a process for generating a gift for delivery to a recipient based on user selection of a gifting product or category in accordance with at least one embodiment.

FIG. 15 shows an illustrative example of a process 1500 for generating a gift for delivery to a recipient based on user selection of a gifting product or category in accordance with at least one embodiment. The process 1500 may be performed by the gifting distribution system, which may be in electrical communication with a gifting application installed on a computing device of a sender of a gift. For instance, the gifting distribution system may obtain information from the gifting application that may be used to generate a gift that can be transmitted to a recipient for redemption.

At step 1502, the gifting distribution system may detect user selecting of a gifting product or category. As described above, a user, via a graphical interface, may be presented with various product and/or product categories from which the user may select one or more products and/or product categories that may be presented to a recipient as a gift or gift options. If the user selects one or more products and/or product categories, the gifting application may transmit this selection to the gifting distribution system.

In response to detecting selection of one or more gifting products and/or product categories, the gifting distribution system may, at step 1504, determine whether user payment is required in order to generate the gift for the specified recipient. For instance, if the sender maintains a balance with the gifting distribution system, the gifting distribution system may determine whether this balance is sufficient to cover the value of each identified product from the set of products and/or product categories specified by the sender. If a user payment is not required to cover the value of the gift, the gifting distribution system may, at step 1512, generate the gift including the selection made by the user for delivery to the recipient. For instance, the gifting distribution system may generate a digital gift card that includes personalized elements associated with the occasion for which the gift was generated (e.g., birthday, anniversary, etc.). Additionally, the digital gift card may include a link to the gifting distribution system, which may present the recipient with the product and/or product categories indicated by the sender, as well as any possible alternatives as described above.

In an embodiment, if user payment is required for the gift, the gifting distribution system may, at step 1506, obtain user payment information or selection of payment information. For instance, the gifting distribution system may transmit a request to the gifting application on the sender's computing device to obtain this payment information. This may cause the gifting application to prompt the sender to provide the requested payment information. In some instances, the sender may enter, via the graphical information, the requested payment information. Alternatively, the sender may select an available payment option, such as from a digital wallet. The gifting application may provide this payment information to the gifting distribution system for validation.

At step 1508, the gifting distribution system may determine whether the payment information or selection made by the sender is valid. For instance, the gifting distribution system may transmit the provided payment information to a corresponding payment service. The payment service may evaluate the provided payment information and determine whether the payment information is associated with the sender and, if so, the account associated with the payment information has sufficient funds for the gift selected by the sender. If the payment information is valid and the sender account has sufficient funds for the gift, the payment service may provide the requisite funds to the gift distribution system for generation of the gift. In response to an indication from the payment service that the payment has been provided, the gifting distribution system, at step 1512, may generate the gift including the selection made by the sender for deliver to the specified recipient.

If the payment information is not valid or the sender account has insufficient funds, the gifting distribution system, at step 1510, may perform operations corresponding to an invalid payment. This may include transmitting a notification to the gifting application to indicate that the gift could not be generated due to the payment information being invalid. This may cause the gifting application to indicate, to the user, that the gift could not be generated. In some instances, the sender may be provided with an additional opportunity to provide alternative payment information, which may be processed by the gifting distribution system, as described above, to determine whether this alternative payment information is valid.

Figure 16:
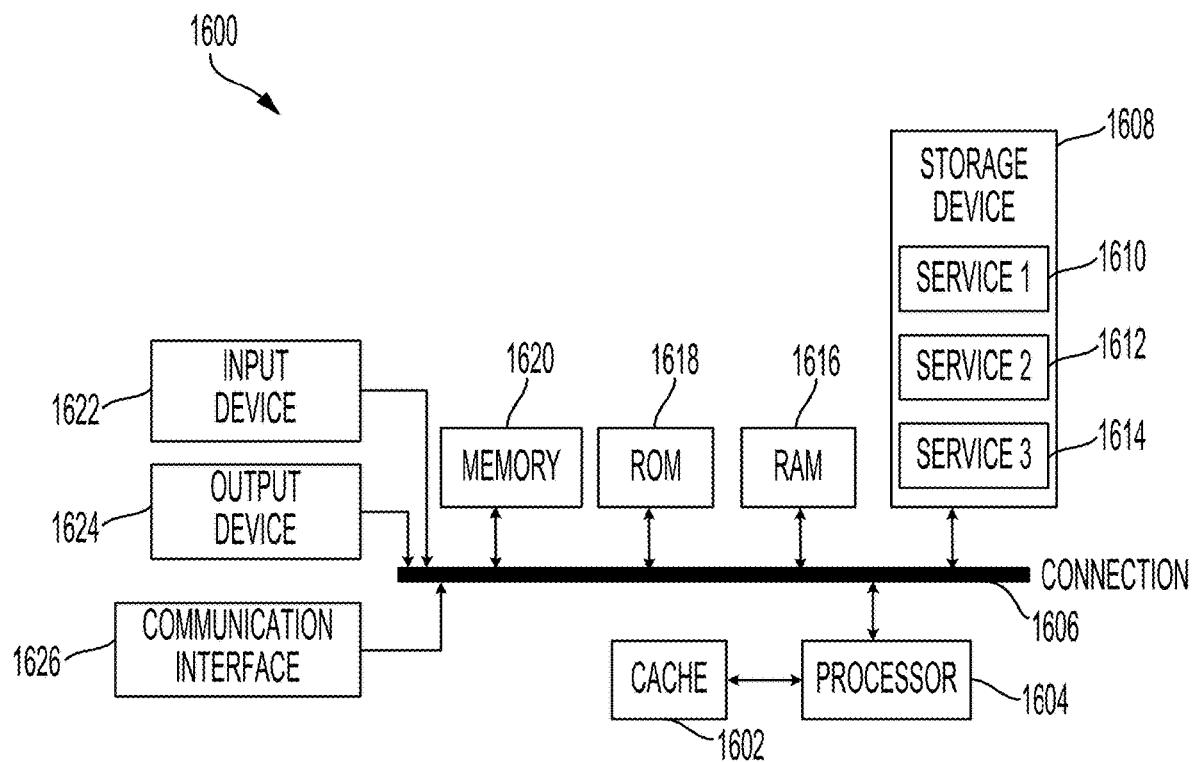
FIG. 16 shows a computing system architecture including various components in electrical communication with each other using a connection in accordance with various embodiments.

FIG. 16 illustrates a computing system architecture 1600 including various components in electrical communication with each other using a connection 1606, such as a bus, in accordance with some implementations. Example system architecture 1600 includes a processing unit (CPU or processor) 1604 and a system connection 1606 that couples various system components including the system memory 1620, such as ROM 1618 and RAM 1616, to the processor 1604. The system architecture 1600 can include a cache 1602 of high-speed memory connected directly with, in close proximity to, or integrated as part of the processor 1604. The system architecture 1600 can copy data from the memory 1620 and/or the storage device 1608 to the cache 1602 for quick access by the processor 1604. In this way, the cache can provide a performance boost that avoids processor 1604 delays while waiting for data. These and other modules can control or be configured to control the processor 1604 to perform various actions.

Other system memory 1620 may be available for use as well. The memory 1620 can include multiple different types of memory with different performance characteristics. The processor 1604 can include any general purpose processor and a hardware or software service, such as service 1 1610, service 2 1612, and service 3 1614 stored in storage device 1608, configured to control the processor 1604 as well as a special-purpose processor where software instructions are incorporated into the actual processor design. The processor 1604 may be a completely self-contained computing system, containing multiple cores or processors, a bus, memory controller, cache, etc. A multi-core processor may be symmetric or asymmetric.

To enable user interaction with the computing system architecture 1600, an input device 1622 can represent any number of input mechanisms, such as a microphone for speech, a touch-sensitive screen for gesture or graphical input, keyboard, mouse, motion input, speech and so forth. An output device 1624 can also be one or more of a number of output mechanisms known to those of skill in the art. In some instances, multimodal systems can enable a user to provide multiple types of input to communicate with the computing system architecture 1600. The communications interface 1626 can generally govern and manage the user input and system output. There is no restriction on operating on any particular hardware arrangement and therefore the basic features here may easily be substituted for improved hardware or firmware arrangements as they are developed.

Storage device 1608 is a non-volatile memory and can be a hard disk or other types of computer readable media which can store data that are accessible by a computer, such as magnetic cassettes, flash memory cards, solid state memory devices, digital versatile disks, cartridges, RAMs 1616, ROM 1618, and hybrids thereof.

The storage device 1608 can include services 1610, 1612, 1614 for controlling the processor 1604. Other hardware or software modules are contemplated. The storage device 1608 can be connected to the system connection 1606. In one aspect, a hardware module that performs a particular function can include the software component stored in a computer-readable medium in connection with the necessary hardware components, such as the processor 1604, connection 1606, output device 1624, and so forth, to carry out the function.

The disclosed gift selection, attribution, and distribution system can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couples the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:
   detecting one or more messages being exchanged with a receiving entity, wherein when the one or more messages are transmitted via an application on a device associated with a sending entity, the application automatically processes the one or more messages;
   automatically identifying an intent of the sending entity, wherein the intent is automatically determined using emotional gift intent prompting executed by the application on the device, wherein the emotional gift intent prompting identifies one or more words indicative of the intent, and wherein the emotional gift intent prompting is automatically applied to the one or more messages as the one or more messages are being transmitted;
providing an option to generate a gift for the receiving entity, wherein the option is identified based on the intent, and wherein the application causes the device to present the option;
receiving, via the application, input corresponding to a selection of the option to generate a gift;
identifying a set of product criteria associated with the intent and the receiving entity, wherein the application identifies the set of product criteria based on the intent and either past gifting history of the sending entity or information associated with previous gifts sent to the receiving entity;
providing one or more product selection options for the gift, wherein the one or more product selection options are selected based on the set of product criteria, and wherein the application causes the device to present the one or more product selection options;
receiving, via the application, input corresponding to a product selection from the one or more product selection options;
generating the gift, wherein the gift is generated via the application in response to the product selection, wherein the gift includes a redemption option for the product selection, and wherein when the gift is generated, the application transmits the gift for distribution; and
updating the past gifting history of the sending entity or the information associated with the previous gifts sent to the receiving entity, wherein the past gifting history of the sending entity or the information associated with the previous gifts sent to the receiving entity is updated using the application and based on the product selection and the intent.

2. The computer-implemented method of claim 1, wherein the one or more words include a hashtag corresponding to the intent.

3. The computer-implemented method of claim 1, wherein the set of product criteria includes one or more product preferences of the receiving entity, and wherein the one or more product preferences of the receiving entity are determined based on preferred activities of the receiving entity.

4. The computer-implemented method of claim 1, wherein the gift further includes one or more alternative product selections from a product category of the product selection.

5. The computer-implemented method of claim 1, wherein the gift is devoid of reference to a value of the product selection.

6. The computer-implemented method of claim 1, wherein the set of product criteria further includes a sentiment of the sending entity.

7. The computer-implemented method of claim 1, wherein the product selection indicates a product category from which the receiving entity can select a product from the product category.

8. The computer-implemented method of claim 1, wherein the intent is a sentiment expressed to the receiving entity via a social media platform.

9. The computer-implemented method of claim 1, wherein the set of product criteria includes a maximum value allocated for the gift.

10. The computer-implemented method of claim 1, wherein the one or more product selection options further include one or more sponsored product selection options selected based on an association between the intent and a sponsor.

11. The computer-implemented method of claim 1, wherein presentation of the option to generate the gift is performed using a pop-up window presented alongside elements of a social media platform.

12. The computer-implemented method of claim 1, wherein the one or more product selection options include one or more products and one or more product categories from which a product is selectable.

13. A system, comprising:
one or more processors; and
memory storing thereon instructions that, as a result of being executed by the one or more processors, cause an application on a device associated with a sending entity to:
detect one or more messages being exchanged with a receiving entity, wherein when the one or more messages are transmitted, the one or more messages are automatically processed;
automatically identify an intent of the sending entity, wherein the intent is automatically determined using emotional gift intent prompting, wherein the emotional gift intent prompting identifies one or more words indicative of the intent, and wherein the emotional gift intent prompting is automatically applied to the one or more messages as the one or more messages are being transmitted;
provide an option to generate a gift for the receiving entity, wherein the option is identified based on the intent, and wherein when the option is received, the option is presented on the device;
identify a set of product criteria associated with the intent and the receiving entity, wherein the set of product criteria is identified based on the intent and either past gifting history of the sending entity or information associated with previous gifts sent to the receiving entity;
provide one or more product selection options for the gift, wherein the one or more product selection options are selected based on the set of product criteria, and wherein when the one or more product selection options are received, the one or more product selection options are presented on the device;
receive input corresponding to a product selection from the one or more product selection options;
generate the gift, wherein the gift is generated in response to receiving input corresponding to the product selection and wherein the gift includes a redemption option for the product selection; and
update the past gifting history of the sending entity or the information associated with the previous gifts sent to the receiving entity, wherein the past gifting history of the sending entity or the information associated with the previous gifts sent to the receiving entity is updated based on the product selection and the intent.

14. The system of claim 13, wherein the intent is a sentiment expressed to the receiving entity via a social media platform.

15. The system of claim 13, wherein the set of product criteria includes a maximum value allocated for the gift.

16. The system of claim 13, wherein the one or more product selection options include one or more products and one or more product categories from which a product is selectable.

17. The system of claim 13, wherein the one or more product selection options further include one or more sponsored product selection options selected based on an association between the intent and a sponsor.

18. The system of claim 13, wherein the one or more words include a hashtag corresponding to the intent.

19. The system of claim 13, wherein the set of product criteria includes one or more product preferences of the receiving entity, wherein the one or more product preferences of the receiving entity are determined based on preferred activities of the receiving entity.

20. The system of claim 13, wherein the gift further includes one or more alternative product selections from a product category of the product selection.

21. The system of claim 13, wherein the gift is devoid of reference to a value of the product selection.

22. The system of claim 13, wherein the set of product criteria further includes a sentiment of the sending entity.

23. The system of claim 13, wherein the product selection indicates a product category from which the receiving entity can select a product from the product category.

24. The system of claim 13, wherein presentation of the option to generate the gift is performed using a pop-up window presented alongside elements of a social media platform.

25. A non-transitory, computer-readable storage medium storing thereon executable instructions that, as a result of being executed by a computer system, cause the computer system to:
  detect one or more messages being exchanged, wherein exchanged messages are associated with a sending entity and a receiving entity;
  automatically identify an intent of the sending entity, wherein the intent is automatically determined using emotional gift intent prompting, wherein the emotional gift intent prompting identifies one or more words indicative of the intent, and wherein the emotional gift intent prompting is automatically applied to the messages as the messages are being exchanged;
  identify a set of product criteria associated with the intent and the receiving entity, wherein the set of product criteria is identified based on the intent and either past gifting history of the sending entity or information associated with previous gifts sent to the receiving entity;
  provide one or more product selection options for the gift, wherein the one or more product selection options are selected based on the set of product criteria, and wherein when the one or more product selection options are received at a device associated with the sending entity, the one or more product selection options are presented;
  receive input corresponding to a product selection from the one or more product selection options;
  generate the gift, wherein the gift is generated in response to receiving an input corresponding to a product selection and wherein the gift includes a redemption option for the product selection; and
  update the past gifting history of the sending entity or the information associated with the previous gifts sent to the receiving entity, wherein the past gifting history of the sending entity or the information associated with the previous gifts sent to the receiving entity is updated based on the product selection and the intent.

26. The non-transitory, computer-readable storage medium of claim 25, wherein the product selection is presented devoid of information corresponding to a value of the product selection.

27. The non-transitory, computer-readable storage medium of claim 25, wherein the gift further includes alternative product selections selectable as an alternative to the product selection.

28. The non-transitory, computer-readable storage medium of claim 25, wherein presentation of the option to generate the gift is performed using a pop-up window presented alongside elements of a social media application.

29. The non-transitory, computer-readable storage medium of claim 25, wherein the set of product criteria includes a maximum value allocated for the gift.

30. The non-transitory, computer-readable storage medium of claim 25, wherein the one or more words include a hashtag corresponding to the intent.

31. The non-transitory, computer-readable storage medium of claim 25, wherein the set of product criteria includes one or more product preferences of the receiving entity, wherein the one or more product preferences of the receiving entity are determined based on preferred activities of the receiving entity.

32. The non-transitory, computer-readable storage medium of claim 25, wherein the set of product criteria further includes a sentiment of the sending entity.

33. The non-transitory, computer-readable storage medium of claim 25, wherein the product selection indicates a product category from which the receiving entity can select a product from the product category.

34. The non-transitory, computer-readable storage medium of claim 25, wherein the intent is a sentiment expressed to the receiving entity via a social media platform.

35. The non-transitory, computer-readable storage medium of claim 25, wherein the one or more product selection options further include one or more sponsored product selection options selected based on an association between the intent and a sponsor.

36. The non-transitory, computer-readable storage medium of claim 25, wherein the one or more product selection options include one or more products and one or more product categories from which a product is selectable.

* * * * *